United States Patent
Jhu et al.

(10) Patent No.: US 12,382,049 B2
(45) Date of Patent: *Aug. 5, 2025

(54) METHODS AND DEVICES FOR QUANTIZATION AND DE-QUANTIZATION DESIGN IN VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Xianglin Wang, San Diego, CA (US); Yi-Wen Chen, San Diego, CA (US); Tsung-Chuan Ma, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,552

(22) Filed: Apr. 16, 2024

(65) Prior Publication Data

US 2024/0283933 A1 Aug. 22, 2024

Related U.S. Application Data

(63) Continuation of application No. 17/702,689, filed on Mar. 23, 2022, now Pat. No. 11,997,278, which is a
(Continued)

(51) Int. Cl.
*H04N 19/126* (2014.01)
*H04N 19/159* (2014.01)
(Continued)

(52) U.S. Cl.
CPC ......... *H04N 19/126* (2014.11); *H04N 19/159* (2014.11); *H04N 19/186* (2014.11); *H04N 19/196* (2014.11)

(58) Field of Classification Search
CPC .. H04N 19/119; H04N 19/124; H04N 19/126; H04N 19/159; H04N 19/186; H04N 19/196; H04N 19/70
(Continued)

(56) References Cited

U.S. PATENT DOCUMENTS 10,277,910 B2  4/2019  Xiu et al.
11,997,278 B2 * 5/2024  Jhu ...................... H04N 19/159
(Continued)

FOREIGN PATENT DOCUMENTS

CN  105359521 A  2/2016
CN  106464872 A  2/2017
(Continued)

OTHER PUBLICATIONS

Yu-Chen Sun, et al., "CE8:WD of palette mode with neighboring pixel copy(CE8-1.1)", Joint Video Experts Team (JVET) of ITU-T SG 16 WP3 and ISO/IEC JTC 1/SC 29/WG 11, JVET-P0060WD, 16th Meeting: Geneva, CH, Oct. 1-11, 2019, (446p).
(Continued)

*Primary Examiner* — Kathleen M Walsh
(74) *Attorney, Agent, or Firm* — Arch & Lake LLP

(57) ABSTRACT

A method for video encoding is provided. The method may be applied in an encoder and includes: determining, for a first coding block, a quantization parameter and a quantized level; deriving a scale value by scaling the quantization parameter by a scale factor, determining a plurality of parameters associated with a coding unit (CU); obtaining a plurality of bit-shifts by bit-shifting the plurality of parameters; and obtaining a plurality of coefficients associated
(Continued)

with the CU based on the quantized level, the scale value, and the plurality of bit-shifts.

18 Claims, 10 Drawing Sheets

Related U.S. Application Data continuation of application No. PCT/US2020/052175, filed on Sep. 23, 2020.

(60) Provisional application No. 62/904,668, filed on Sep. 23, 2019.

(51) Int. Cl.
    *H04N 19/186*     (2014.01)
    *H04N 19/196*     (2014.01)

(58) Field of Classification Search
    USPC ..................................................... 375/240.03
    See application file for complete search history.

(56) References Cited

U.S. PATENT DOCUMENTS

| | | |
|---|---|---|
| 2014/0376608 A1 | 12/2014 | Tourapis |
| 2015/0172661 A1 | 6/2015 | Dong et al. |
| 2015/0341660 A1 | 11/2015 | Joshi et al. |
| 2015/0365671 A1 | 12/2015 | Pu et al. |
| 2016/0227231 A1* | 8/2016 | Xiu ................ H04N 19/186 |
| 2017/0085891 A1 | 3/2017 | Seregin et al. |
| 2017/0127058 A1 | 5/2017 | Misra et al. |
| 2017/0127077 A1 | 5/2017 | Chuang et al. |
| 2018/0184088 A1 | 6/2018 | Byun |
| 2024/0283931 A1* | 8/2024 | Jhu ................ H04N 19/196 |
| 2024/0283932 A1* | 8/2024 | Jhu ................ H04N 19/159 |

FOREIGN PATENT DOCUMENTS

| | | |
|---|---|---|
| CN | 106664405 A | 5/2017 |
| CN | 107211122 A | 9/2017 |
| CN | 107211134 A | 9/2017 |
| IN | 201647016464 A | 8/2016 |
| JP | 2018510539 A | 4/2018 |
| KR | 101810312 B1 | 12/2017 |
| WO | 2021030667 A1 | 2/2021 |
| WO | 2021040400 A1 | 3/2021 |

OTHER PUBLICATIONS

Yung-Hsuan Chao, et al., "Non-CE8: Quantization in palette escape mode", Joint Video Experts Team (JVET) of ITU-T SG 16 WP 3 and ISO/IEC JTC 1/SC 29/WG 11, JEVT-P0483, 16th Meeting: Geneva, CH, Oct. 1-11, 2019, (4p).
Benjamin Bross, et al., "Versatile Video Coding (Draft 6)" Joint Video Experts Team (JVET) of ITU-T SG 16 WP 3 and ISO/IEC JTC 1/SC 29/WG 11, JEVT-O2001(VE), 15th Meeting: Gothenburg, SE, Jul. 3-12, 2019, (455p).
Hong-Jheng Jhu et al., :Non-CE8: Quantization unification for palette escape and transform skip, Joint Video Experts Team (JVET) of ITU-T SG 16 WP 3 and ISO/IEC JTC 1/SC 29/WG 11, JEVT-P515-v2, 16th Meeting: Geneva, CH, Oct. 1-11, 2019, (9p).
KROA of Application No. 10-2022-7013359 dated Jun. 14, 2022 with English translation, (7p).
Extended European Search Report issued in Application No. 20870350.4, dated Oct. 31, 2022, (5p).
Rajan Joshi et al., "High Efficiency Video Coding (HEVC) Screen Content Coding: Draft 4" Joint Collaborative Team on Video Coding (JCT-VC) of ITU-T SG 16 WP 3 and ISO/IEC JTC 1/SC 29/WG 11, JCTVC-U1005, 21st Meeting: Warsaw, PL, Jun. 19-26, 2015, (665p).
First CNOA issued in Application No. 202210541301.X dated Oct. 8, 2022, with English translation, (12p).
InterDigital Communications, LLC, Xiaoyu Xiu et al., :"Description of screen content coding technology proposal by InterDigital" Joint Collaborative Team on Video Coding (JCT-VC) of ITU-T SG 16 WP 3 and ISO/IEC JTC 1/SC 29/WG 11, JCTVC-Q0037, 17th Meeting: Valencia, ES, Mar. 4-Apr. 4, 2014, (31p).
International Search Report issued of PCT/US2020/052175 dated Jan. 8, 2021, (3p).
Qualcomm Incorporated, Vadim Seregin et al., "Restriction on signalling for palette escape samples" Joint Collaborative Team on Video Coding (JCT-VC) of ITU-T SG 16 WP 3 and ISO/IEC JTC 1/SC 29/WG 11, JCTVC-V0041, 22nd Meeting: Geneva, CH, Oct. 15-21, 2015, (5p).
Second Office Action of Chinese Application No. 202210541301.X dated Jan. 19, 2023 with English Translation, (25p).
Second Office Action of Japanese Application No. 2022-518415 dated Jan. 10, 2020 with English Translation, (7p).
Yu-Chen, et al., "CE8:WD of palette mode with neighboring pixel copy(CE8-1.1)", Joint Video Experts Team (JVET) of ITU-T SG 16 WP3 and ISO/IEC JTC 1/SC 29/WG 11, JVET-P0060WD, 16th Meeting: Geneva, CH, Oct. 1-11, 2019, (446p).
Benjamin Bross, et al., "Versatile Video Coding (Draft 6)" Joint Video Experts Team (JVET) of ITU-T SG 16 WP 3 and ISO/IEC JTC 1/SC 29/WVG 11, JEVT-O2001(VE), 15th Meeting: Gothenburg, SE, Jul. 3-12, 2019, (455p).

* cited by examiner

SPLIT_BT_VER  SPLIT_BT_HOR  SPLIT_TT_VER  SPLIT_TT_HOR horizontal traverse scan vertical traverse scan

METHODS AND DEVICES FOR QUANTIZATION AND DE-QUANTIZATION DESIGN IN VIDEO CODING

CROSS-REFERENCE TO RELATED APPLICATIONS

This application is a continuation of U.S. application Ser. No. 17/702,689, filed on Mar. 23, 2022, which is a continuation of International Application No. PCT/US2020/052175, filed on Sep. 23, 2020, which claims priority to U.S. Provisional Application No. 62/904,668 filed on Sep. 23, 2019, the entire disclosures of which are incorporated herein by reference for all purposes.

FIELD

The present disclosure generally relates to video coding and compression, and in particular but not limited to, methods and devices for quantization and de-quantization design in video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

In general, this disclosure describes examples of techniques relating to quantization and de-quantization design in video coding.

According to a first aspect of the present disclosure, there is provided a method for video coding applied in an encoder, including: determining a quantization parameter for residual data of a coding unit (CU); deriving a scale value by scaling the quantization parameter by a scale factor; determining a plurality of coefficients associated with the CU; determining a plurality of parameters associated with the CU; obtaining a plurality of bit-shifts by bit-shifting the plurality of parameters; and obtaining a quantized level based on the scale value, the plurality of coefficients, and the plurality of bit-shifts.

According to a second aspect of the present disclosure, there is provided a method for video coding applied in a decoder, including: receiving a video bitstream including a quantization parameter and a quantized level; deriving a scale value by scaling the quantization parameter by a scale factor; determining a plurality of parameters associated with a CU; obtaining a plurality of bit-shifts by bit-shifting the plurality of parameters; and obtaining a plurality of coefficients associated with the CU based on the quantized level, the scale value, and the plurality of bit-shifts.

According to a third aspect of the present disclosure, there is provided a computing device, including: one or more processors; a non-transitory storage coupled to the one or more processors; and a plurality of programs stored in the non-transitory storage that, when executed by the one or more processors, cause the one or more processors to perform acts including: determining a quantization parameter for residual data of a CU; deriving a scale value by scaling the quantization parameter by a scale factor; determining a plurality of coefficients associated with the CU; determining a plurality of parameters associated with the CU; obtaining a plurality of bit-shifts by bit-shifting the plurality of parameters; and obtaining a quantized level based on the scale value, the plurality of coefficients, and the plurality of bit-shifts.

According to a fourth aspect of the present disclosure, there is provided a computing device, including: one or more processors; a non-transitory storage coupled to the one or more processors; and a plurality of programs stored in the non-transitory storage that, when executed by the one or more processors, cause the one or more processors to perform acts including: receiving a video bitstream including a quantization parameter and a quantized level; deriving a scale value by scaling the quantization parameter by a scale factor; determining a plurality of parameters associated with a CU; obtaining a plurality of bit-shifts by bit-shifting the plurality of parameters; and obtaining a plurality of coefficients associated with the CU based on the quantized level, the scale value, and the plurality of bit-shifts.

According to a fifth aspect of the present disclosure, there is provided a non-transitory computer readable storage medium storing a plurality of programs for execution by a computing device having one or more processors, wherein the plurality of programs, when executed by the one or more processors, cause the one or more processors to perform acts including: determining a quantization parameter for residual data of a CU; deriving a scale value by scaling the quantization parameter by a scale factor; determining a plurality of coefficients associated with the CU; determining a plurality of parameters associated with the CU; obtaining a plurality of bit-shifts by bit-shifting the plurality of parameters; and obtaining a quantized level based on the scale value, the plurality of coefficients, and the plurality of bit-shifts.

According to a sixth aspect of the present disclosure, there is provided a non-transitory computer readable storage medium storing a plurality of programs for execution by a computing device having one or more processors, wherein the plurality of programs, when executed by the one or more processors, cause the one or more processors to perform acts including: receiving a video bitstream including a quantization parameter and a quantized level; deriving a scale value by scaling the quantization parameter by a scale factor; determining a plurality of parameters associated with a CU; obtaining a plurality of bit-shifts by bit-shifting the plurality of parameters; and obtaining a plurality of coefficients associated with the CU based on the quantized level, the scale value, and the plurality of bit-shifts.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 8A and FIG. 8B show horizontal and vertical traverse scans in accordance with some implementations of the present disclosure.

DETAILED DESCRIPTION

Figure 1:
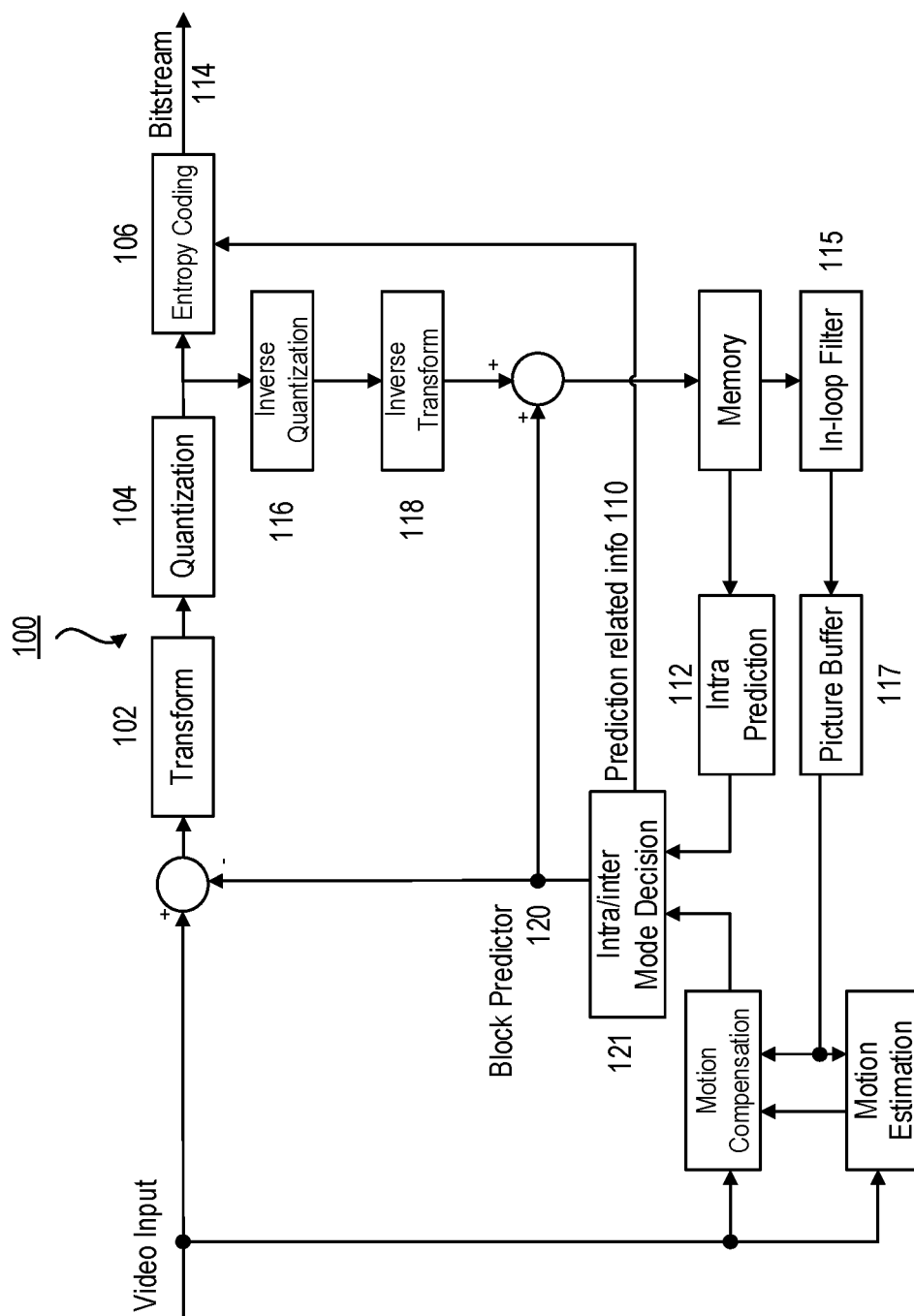
FIG. 1 is a block diagram illustrating an exemplary video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an exemplary video encoder in accordance with some implementations of the present disclosure. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

To improve coding efficiency and visual quality, an in-loop filter is used. For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

Figure 2:
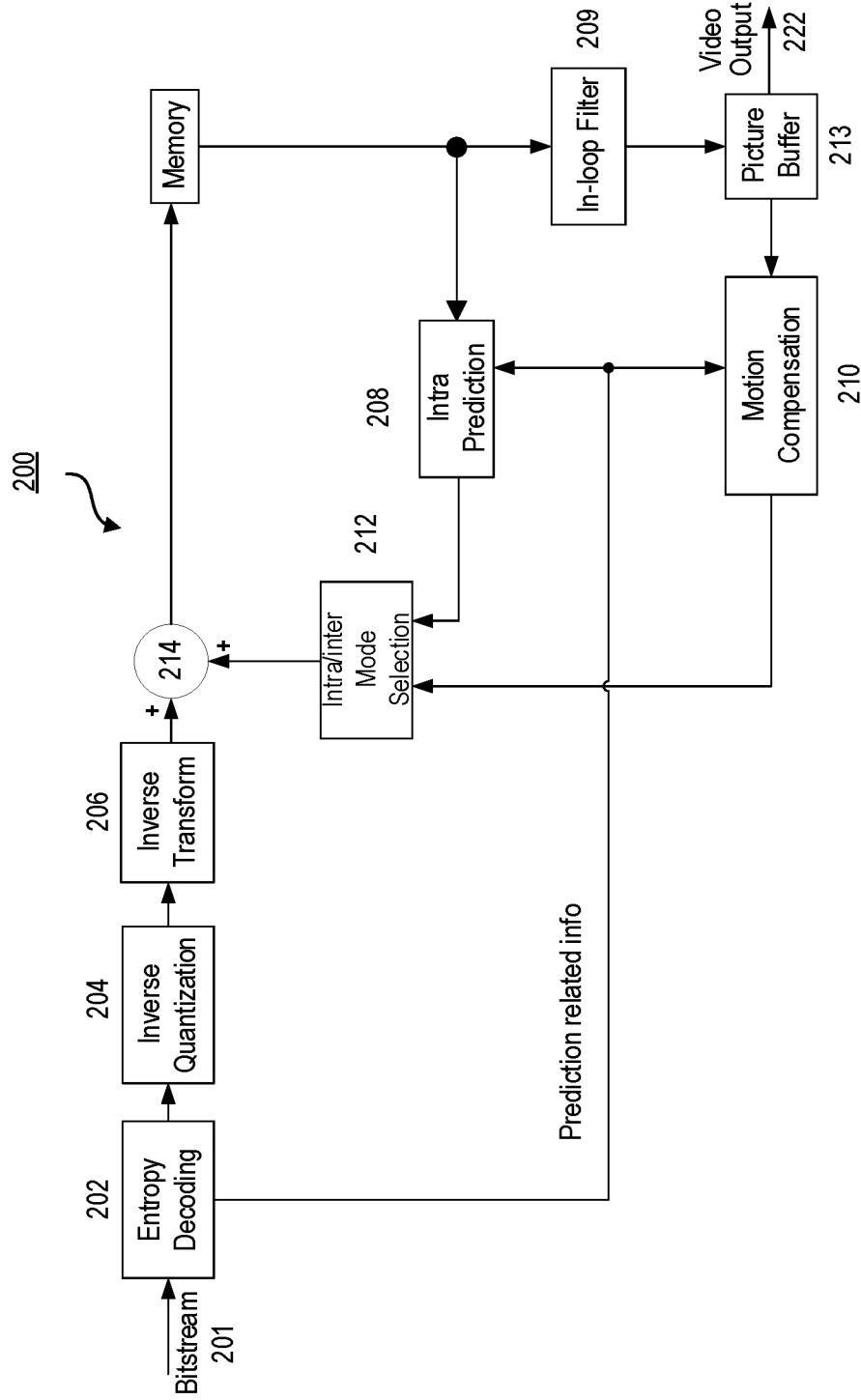
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. In a Joint Video Experts Team (JVET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC. A quadtree is a tree in which a parent node can be split into four child nodes, each of which may become another parent node for another split into four new child nodes.

In VVC, the picture partitioning structure divides the input video into blocks called coding tree units (CTUs). A CTU is split using a quadtree with nested multi-type tree structure into coding units (CUs), with a leaf CU defining a region sharing the same prediction mode, for example, intra or inter. In the disclosure, the term "unit" defines a region of an image covering all components; the term "block" is used to define a region covering a particular component, for example, luma, and may differ in spatial location when considering the chroma sampling format such as 4:2:0.

Partitioning a Picture into CTUs

Figure 3:
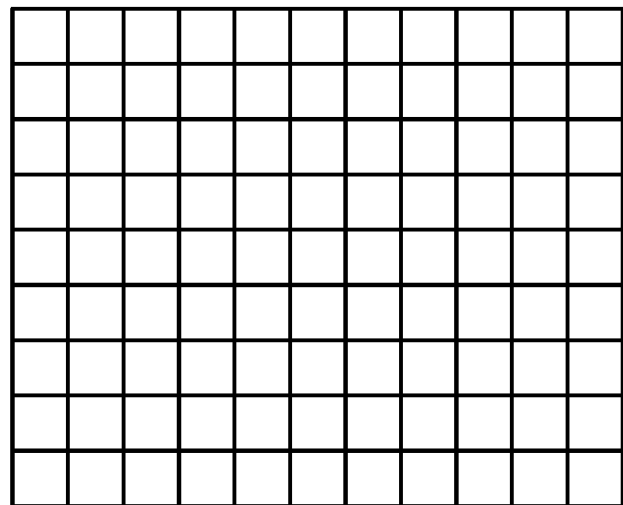
FIG. 3 shows a picture divided into coding tree units (CTUs) in accordance with some implementations of the present disclosure.

A picture may be divided into a sequence of coding tree units (CTUs). The CTU concept is same to that of the HEVC. For a picture that has three sample arrays, a CTU consists of an N×N block of luma samples together with two corresponding blocks of chroma samples. FIG. 3 shows a picture divided into CTUs in accordance with some implementations of the present disclosure. The maximum allowed size of the luma block in a CTU is specified to be 128×128. And the maximum size of the luma transform blocks is 64×64.

Partitioning CTUs Using a Tree Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at a leaf CU level. Each leaf CU can be further split into one, two, or four prediction units (PUs) according to a PU splitting type. Inside one PU, a same prediction process is applied and relevant information is transmitted to a decoder on a PU basis. After obtaining a residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types. For example, it removes the separation of the CU, PU, and TU concepts except as needed for CUs that have a size too large for the maximum transform length, and supports more flexibility for CU partition shapes. In a coding tree structure, a CU may have either a square or rectangular shape. A CTU is first partitioned by a quaternary tree, that is quadtree, structure. Then leaf nodes of the quaternary tree may be further partitioned by a multi-type tree structure.

Figure 4:
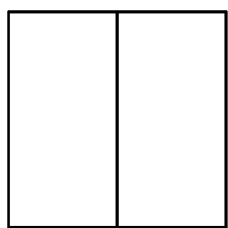
FIG. 4 is a schematic diagram illustrating multi-type tree splitting modes in accordance with some implementations of the present disclosure.
Figure 4:
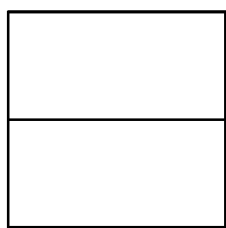
Figure 4:
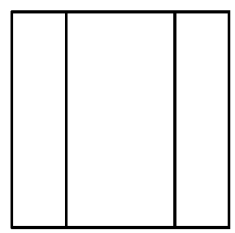
Figure 4:
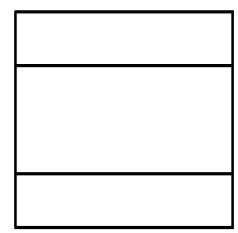

FIG. 4 is a schematic diagram illustrating multi-type tree splitting modes in accordance with some implementations of the present disclosure. As shown in FIG. 4, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). Leaf nodes of the multi-type tree are called CUs, and unless the CU is too large for the maximum transform length, this segmentation is used for prediction and transform processing without any further partitioning. Thus, the CU, PU and TU may have a same block size in the quadtree with nested multi-type tree coding block structure. Exception occurs when maximum supported transform length is smaller than the width or height of the color component of the CU.

Figure 5:
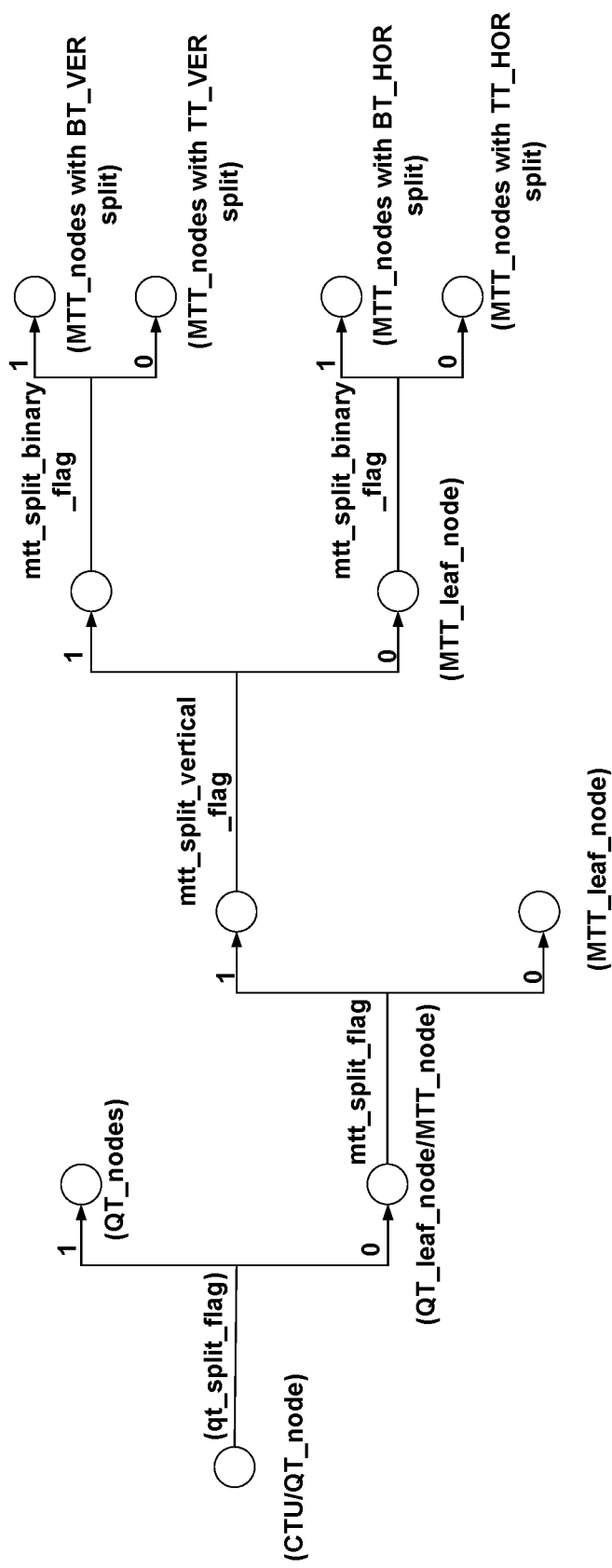
FIG. 5 illustrates a signaling mechanism of partition splitting information in a quadtree with nested multi-type tree coding tree structure in accordance with some implementations of the present disclosure.

FIG. 5 illustrates a signaling mechanism of partition splitting information in a quadtree with nested multi-type tree coding tree structure in accordance with some implementations of the present disclosure. A CTU is treated as a root of a quaternary tree and is first partitioned by a quaternary tree structure. Each quaternary tree leaf node, when sufficiently large to allow it, is then further partitioned by a multi-type tree structure. In the multi-type tree structure, a first flag (mtt_split_cu_flag) is signaled to indicate whether the node is further partitioned. When a node is further partitioned, a second flag (mtt_split_cu_vertical_flag) is signaled to indicate a splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

| MttSplitMode derivation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 6:
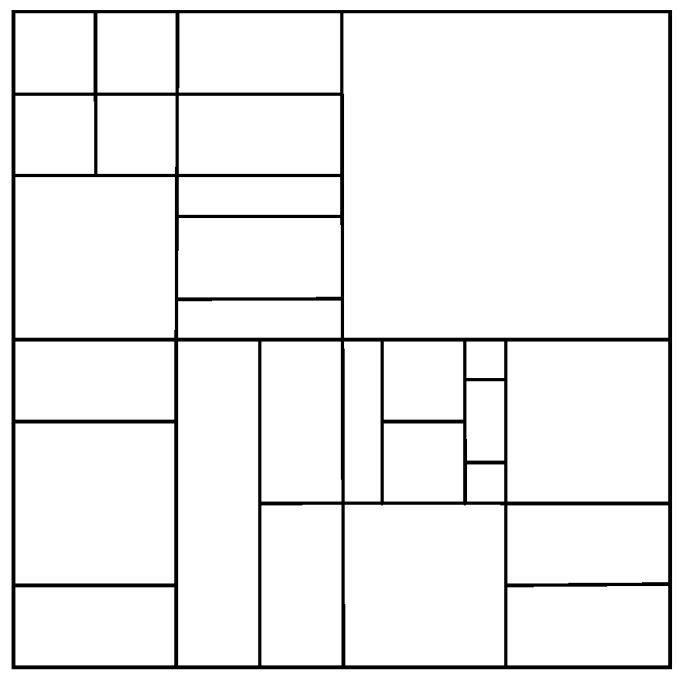
FIG. 6 shows a CTU divided into multiple CUs with a quadtree with nested multi-type tree coding block structure in accordance with some implementations of the present disclosure.

FIG. 6 shows a CTU divided into multiple CUs with a quadtree with nested multi-type tree coding block structure in accordance with some implementations of the present disclosure. As shown in FIG. 6, bold block edges represent quadtree partitioning and the remaining edges represent multi-type tree partitioning. The quadtree with nested multi-type tree partition provides a content-adaptive coding tree structure comprised of CUs. The size of a CU may be as large as the CTU or as small as 4×4 in units of luma samples.

For the case of the 4:2:0 chroma format, the maximum chroma coding block (CB) size is 64×64 and the minimum chroma CB size is 2×2.

In VVC, the maximum supported luma transform size is 64×64 and the maximum supported chroma transform size is 32×32. When the width or height of a CB is larger than the maximum transform width or height, the CB is automatically split in the horizontal and/or vertical direction to meet the transform size restriction in that direction.

Following parameters are defined and specified by Sequence Parameter Set (SPS) syntax elements for the quadtree with nested multi-type tree coding tree scheme.
CTU size: the root node size of a quaternary tree;
MinQTSize: the minimum allowed quaternary tree leaf node size;
MaxBtSize: the maximum allowed binary tree root node size;
MaxTtSize: the maximum allowed ternary tree root node size;
MaxMttDepth: the maximum allowed hierarchy depth of multi-type tree splitting from a quadtree leaf node;
MinBtSize: the minimum allowed binary tree leaf node size;
MinTtSize: the minimum allowed ternary tree leaf node size.

In one example of the quadtree with nested multi-type tree coding tree structure, CTU size is set as 128×128 luma samples with two corresponding 64×64 blocks of 4:2:0 chroma samples. MinQTSize is set as 16×16, MaxBtSize is set as 128×128, and MaxTtSize is set as 64×64. MinBtSize and MinTtSize, for both width and height, are set as 4×4, and MaxMttDepth is set as 4. The quaternary tree partitioning is applied to the CTU first to generate quaternary tree leaf nodes. The quaternary tree leaf nodes may have a size from 16×16, that is MinQTSize, to 128×128, that is the CTU size. If a leaf QT node is 128×128, it will not be further split by the binary tree since the size exceeds MaxBtSize and MaxTtSize, that is, 64×64. Otherwise, the leaf quadtree node could be further partitioned by the multi-type tree. Therefore, the quaternary tree leaf node is also the root node for the multi-type tree and it has multi-type tree depth, that is mttDepth, as 0. When the multi-type tree depth reaches MaxMttDepth, that is, 4, no further splitting is considered. When the multi-type tree node has width equal to MinBtSize and smaller than or equal to 2*MinTtSize, no further horizontal splitting is considered. Similarly, when the multi-type tree node has height equal to MinBtSize and smaller than or equal to 2*MinTtSize, no further vertical splitting is considered.

Figure 7:
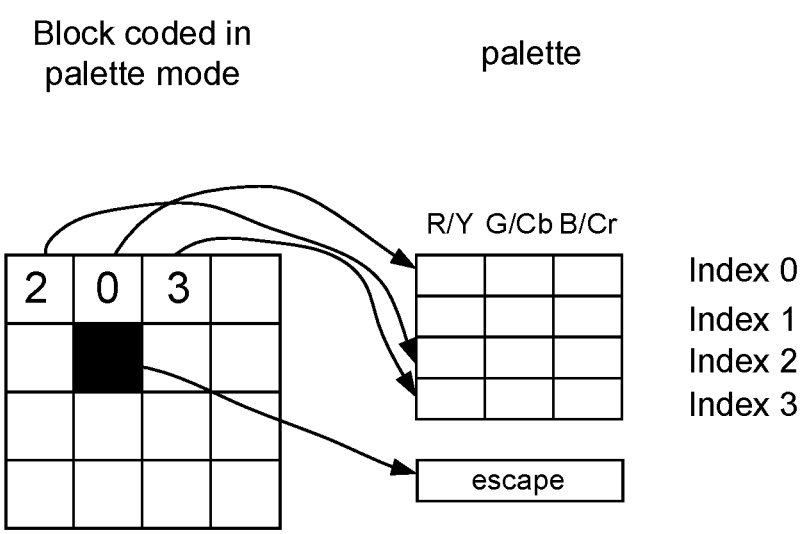
FIG. 7 shows an example of a block coded in a palette mode in accordance with some implementations of the present disclosure.

FIG. 7 shows an example of a block coded in a palette mode in accordance with some implementations of the present disclosure. To allow 64×64 Luma block and 32×32 Chroma pipelining design in VVC hardware decoders, TT split is forbidden when either width or height of a luma coding block is larger than 64, as shown in FIG. 7. TT split is also forbidden when either width or height of a chroma coding block is larger than 32.

In VVC, the coding tree scheme supports the ability for luma and chroma to have a separate block tree structure. This CU splitting structure is termed dual tree structure or dual coding tree structure. The CU splitting structure shared by both the luma and chroma is termed as single tree structure or single coding tree structure. For P and B slices, the luma and chroma coding tree blocks (CTBs) in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

Multiple Transform Selection (MTS) for Core Transform

In addition to DCT-II which has been employed in HEVC, an MTS scheme is used for residual coding both inter and intra coded blocks. It uses multiple selected transforms from DCT8/DST7. The newly introduced transform matrices are DST-VII and DCT-VIII. Table 2 shows basic functions of a selected DST/DCT.

TABLE 2

Transform basis functions of DCT-II/VIII and DST-VII for N-point input

| Transform Type | Basis function $T_i(j)$, i, j = 0, 1, ..., N − 1 |
| --- | --- |
| DCT-II | $T_i(j) = \omega_0 \cdot \sqrt{\frac{2}{N}} \cdot \cos\left(\frac{\pi \cdot i \cdot (2j+1)}{2N}\right)$ <br> where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep orthogonality of a transform matrix, transform matrices are quantized more accurately than the transform matrices in HEVC. To keep intermediate values of transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signaled to indicate whether MTS is applied or not. Here, MTS is applied only for luma. The MTS CU level flag is signaled when following conditions are satisfied: first, both width and height are smaller than or equal to 32; second, CBF flag is equal to one.

If MTS_CU_flag equals to zero, then DCT2 is applied in both directions. However, if MTS_CU_flag is equal to one, then two other flags are additionally signaled to indicate the transform type for the horizontal and vertical directions, respectively. Transform and signaling mapping table as shown in Table 3. Unified the transform selection for ISP and implicit MTS is used by removing the intra-mode and block-shape dependencies. If current block is ISP mode or if the current block is intra block and both intra and inter explicit MTS is on, then only DST7 is used for both horizontal and vertical transform cores. When it comes to transform matrix precision, 8-bit primary transform cores are used. Therefore, all the transform cores used in HEVC are kept as the same, including 4-point DCT2 and DST7, 8-point, 16-point, and 32-point DCT2. Also, other transform cores including 64-point DCT2, 4-point DCT8, 8-point, 16-point, 32-point DST7 and DCT8, use 8-bit primary transform cores.

TABLE 3

Transform and signaling mapping table

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST7 and DCT8, High frequency transform coefficients are zeroed out for the DST7 and DCT8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signaled when the CU level MTS_CU_flag is not equal to zero. The block size limitation for transform skip is the same to that for MTS in JEM4, which indicate that transform skip is applicable for a CU when both block width and height are equal to or less than 32. Note that implicit MTS transform is set to DCT2 when LFNST or MIP is activated for the current CU. Also, the implicit MTS can be still enabled when MTS is enabled for inter coded blocks.

Quantization Parameter Control

In some examples, Maximum QP may be extended from 51 to 63, and signaling of initial Quantization Parameter (QP) may be changed accordingly. The initial value of SliceQpY is modified at a slice segment layer when a non-zero value of slice_qp_delta is coded. Specifically, the value of init_qp_minus26 may be modified to be in the range of (−26+QpBdOffsetY) to +37. When the size of a transform block is not a power of 4, the transform coefficients are processed along with a modification to the QP or QP levelScale table rather than by multiplication by 181/256 (or 181/128), to compensate for an implicit scaling by the transform process. For transform skip block, minimum allowed QP is defined as 4 because quantization step size becomes 1 when QP is equal to 4.

In some examples, a fixed look-up table is used to convert a luma quantization parameter QPY to a chroma quantization parameter QPC. In VVC, a more flexible luma-to-chroma QP mapping is used. Instead of having a fixed table, the luma-to-chroma QP mapping relationship is signaled in SPS using a flexible piecewise linear model, with the only constraint on the linear model being that the slope of each piece cannot be negative. That is, as luma QP increases, chroma QP must stay flat or increase, but cannot decrease. The piecewise linear model is defined by: 1) number of pieces in the model; and 2) input (luma) and output (chroma) delta QPs for that piece. The input range of the piecewise linear model is [−QpBdOffsetY, 63] and the output range of the piecewise linear model is [−QpBdOffsetC, 63]. The QP mapping relationship can be signaled separately for Cb, Cr, and joint Cb/Cr coding, or signaled jointly for all three types of residual coding.

Same as in HEVC, CU-level QP adaptation is allowed in VVC. Delta QP values for luma and chroma components can be signaled separately. For the chroma components, the allowed chroma QP offset values are signaled in the form of offset lists in picture parameter set (PPS) in a similar manner as in HEVC. The lists are defined separately for Cb, Cr, and joint Cb/Cr coding. Up to 6 offset values are allowed for each of Cb, Cr, and joint Cb/Cr lists. At CU-level, an index is signaled to indicate which one of the offset values in the offset list is used to adjust the chroma QP for that CU.

Quantization and De-Quantization Processes for Transform Coefficients

Transformation processes require resulting coefficients to be scaled by a certain factor, followed by a shift operation during quantization and de-quantization processes. The scale factor is defined as follows:

$$\text{factor} = \frac{1}{\sqrt{(M \cdot N)}} \qquad (1)$$

where M and N are the width and height of a transform block.

In some examples, dimensions of a block are powers of 2, i.e. $M=2^m$ and $N=2^n$. This means that when M is equal to N, or indeed when M·N is power of 4, the factor can be applied by a right-shift. Blocks satisfying such conditions are referred as term "normal block." When M·N is not a power of 4, different scale and shift values are used to compensate. The scale values are defined as in Table 4. Blocks satisfying such conditions are referred as term "compensated block."

TABLE 1

Scale Table

| QP % 6 | | 0 | 1 | 2 | 3 | 4 | 5 |
|---|---|---|---|---|---|---|---|
| encScale [QP % 6] | Normal blocks | 26214 | 23302 | 20560 | 18396 | 16384 | 14564 |
| decScale [QP % 6] | | 40 | 45 | 51 | 57 | 64 | 72 |
| encScale [QP % 6] | Compensated blocks | 18396 | 16384 | 14564 | 13107 | 11651 | 10280 |
| decScale [QP % 6] | | 57 | 64 | 72 | 80 | 90 | 102 |

For blocks coded in transform skip mode, scale and shift operations defined for normal blocks are performed.

The derivation of a scaled transform coefficient is illustrated in Table 5. The definitions of all the variables in Table 5 can be found in the version 6 of VVC draft specification.

TABLE 5

The variable rectNonTsFlag is derived as follows:
    rectNonTsFlag = ( ( ( Log2( nTbW ) + Log2( nTbH ) ) & 1 )  = =  1 && transform skip flag[ xTbY ][ yTbY ] = = 0 )
The variables bdShift, rectNorm and bdOffset are derived as follows:
    bdShift = bitDepth + ( ( rectNonTsFlag  ?  1  :  0 ) + ( Log2( nTbW ) + Log2( nTbH ) ) / 2 )
    −5 + dep_quant_enabled_flag
    bdOffset = ( 1 << bdShift ) >> 1
The list levelScale[ ][ ] is specified as levelScale[ j ][ k ] = { { 40, 45, 51, 57, 64, 72 }, { 57, 64, 72, 80, 90, 102 } } with j = 0..1, k = 0..5.

TABLE 5-continued

The (nTbW)x(nTbH) array dz is set equal to the (nTbW)x(nTbH) array TransCoeffLevel[ xTbY ][ yTbY ][ cIdx ].
For the derivation of the scaled transform coefficients d[ x ][ y ] with x = 0..nTbW − 1, y = 0..nTbH − 1, the following applies:
 — The intermediate scaling factor m[ x ][ y ] is derived as follows:
  — If one or more of the following conditions are true, m[ x ][ y ] is set equal to 16:
   — sps scaling list enabled flag is equal to 0.
   — transform skip flag[ xTbY ][ yTbY ] is equal to 1.
  — Otherwise, the following applies:
   m[ x ][ y ] = ScalingFactor[ Log2( nTbW ) ][ Log2( nTbH ) ][ matrixId ][ x ][ y ]
 — The scaling factor ls[ x ][ y ]is derived as follows:
  — If dep_quant_enabled_flag is equal to 1, the following applies:
   ls[ x ][ y ] = ( m[ x ][ y ] * levelScale[ rectNonTsFlag ][ (qP + 1) % 6 ] ) << ( (qP + 1) / 6 )
  — Otherwise (dep_quant_enabled_flag is equal to 0), the following applies:
   ls[ x ][ y ] = ( m[ x ][ y ] * levelScale[ rectNonTsFlag ][ qP % 6 ] ) << ( qP / 6 )
 — When BdpcmFlag[ xTbY IF yYbY ] is equal to 1, dz[ x ][ y ] is modified as follows:
  — If BdpcmDir[ xTbY ][ yYbY ] is equal to 0 and x is greater than 0, the following applies:
   dz[ x ][ y ] = Clip3( CoeffMin, CoeffMax, dz[ x − 1 ][ y ] + dz[ x ][ y ])
  — Otherwise, if BdpcmDir[ xTbY ][ yYbY ] is equal to 1 and y is greater than 0, the following applies:
   dz[ x ][ y ] = Clip3( CoeffMin, CoeffMax, dz[ x ][ y − 1 ] + dz[ x ][ y ])
 — The value dnc[ x ][ y ] is derived as follows:
  dnc[ x ][ y ] = ( dz[ x ][ y ] * ls[ x ][ y ] +bdOffset )   >>    bdShift
 — The scaled transform coefficient d[ x ][ y ] is derived as follows:
  d[ x ][ y ] = Clip3( CoeffMin, CoeffMax, dnc[ x ][ y ] )

Given a QP value used, quantization and de-quantization processes for transform coefficients may be described as follows. Quantization may be described by equation (2):

$$pLevel = Quant(pCoeff) = pCoeff \times \frac{encScale[rectNonTsFlag][QP\%6]}{2^{14} \times 2^{(QP/6)} \times 2^{transformShift'}} \quad (2)$$

De-quantization may be described by equation (3):

$$pCoeff' = Quant^{-1}(pLevel) = \\ pLevel \times \frac{decScale[rectNonTsFlag][QP\%6] \times 2^{(QP/6)} \times 2^{transformShift'}}{2^6} \quad (3)$$

where the variable rectNonTsFlag may be obtained by equation (4):

$$rectNonTsFlag = \\ (((Log2(W) + Log2(H)) \& 1) == 1 \&\& transform\_skip\_flag == 0) \quad (4)$$

and the variable transformShift' may be obtained by equation (5):

$$transforShift' = rectNonTsFlag \,?\,(transformShift - 1): transformShift \quad (5)$$

Here, pCoeff is a transform coefficient value; pLevel is a quantized value or quantization level; pCoeff' is reconstructed transform coefficient values from de-quantization process.

The variable rectNonTsFlag represents if a current block is classified as a "normal block" or a "compensated block." When it has a value of false or 0, the current block is classified as a normal block. When it has a value of true or 1, the current block is classified as a compensated block.

The variable transformShift represents a bit-shift that is used to compensate the dynamic range increase due to 2-dimensional (2D) transforms, which is equal to 15−bitDepth−(log$_2$(W)+log$_2$(H))/2, where W and H are the width and height of the current transform unit, bitDepth is a coding bit-depth. Depending on the value of rectNonTsFlag, the actual value used in the shift operation, transformShift', may take a same value as transformShift, or a value equal to (transformShift−1).

encScale[ ][ ] and decScale[ ][ ] are quantization and dequantization scaling values which are in 14-bit and 6-bit precision respectively, and defined as shown in Table 4. Depending on the value of rectNonTsFlag, a set of scaling factors used for the "normal blocks" or "compensated blocks" are selected and used for the current block.

Quantization and De-Quantization Processes for Transform Skip Mode

Under a transform skip mode, prediction residuals are quantized and coded directly without transform operations performed. More specifically, its quantization and de-quantization processes can be described as follows.

Quantization may be described by equation (6):

$$pLevel = \\ Quant_{TS}(pResi) = pResi \cdot 2^{transformShift} \frac{encScale[QP\%6]}{2^{14} \times 2^{(QP/6)} \times 2^{transformShift}} \quad (6)$$

De-quantization may be described by equation (7):

$$pResi' = Quant_{TS}^{-1}(pLevel) = \\ \frac{pLevel}{2^{transformShift}} \times \frac{decScale[QP\%6] \times 2^{(QP/6)} \times 2^{transformShift}}{2^6} \quad (7)$$

where pResi and pResi' are original and reconstructed prediction residual sample values; pLevel is a quantized value, or quantization level; encScale[ ] and decScale[ ] are the quantization and dequantization scaling values which are in 14-bit and 6-bit precision respectively, and defined the same as those used for "normal blocks" shown in Table 4.

Quantization and De-Quantization Processes for Palette Mode

VTM6 supports the palette mode for screen content coding in 4:4:4 color format. When the palette mode is enabled and if a CU size is smaller than or equal to 64×64, a flag is transmitted at the CU level to indicate whether the palette mode is used for the CU. Palette mode is signaled as a prediction mode other than an intra prediction, inter prediction, and intra block copy (IBC) mode.

If the palette mode is utilized for a CU, the sample values in the CU may be represented by a small set of representative color values. The set is referred as "palette." For pixels with values close to the palette colors, palette indices may be signaled to convey their values to the decoder. It is also possible to specify a sample whose values are not close to any palette color by signaling an escape symbol index, followed by escape values. The escape values are the sample's quantized component values. This is illustrated in FIG. 7.

For quantization and de-quantization of the escape value, the following equations describe the corresponding processes that are applied at the encoder and the decoder, respectively.

Quantization may be described by equation (8):

$$pLevel = Quant_E(pEsca) = pEsca \times \frac{encScale[QP\%6]}{2^{14} \times 2^{(QP/6)}} \quad (8)$$

De-quantization may be described by equation (9):

$$pEsca' = Quant_E^{-1}(pLevel) = pLevel \times \frac{decScale[QP\%6] \times 2^{(QP/6)}}{2^6} \quad (9)$$

where pEsca and pEsca' are original and reconstructed escape values; pLevel is a quantized value, or quantization level; encScale[ ] and decScale[ ] are quantization and dequantization scaling values which are respectively in 14-bit and 6-bit precision, and defined the same as those used for "normal blocks" shown in Table 4.

For coding of the palette, a palette predictor including a list of colors is maintained. The predictor is initialized to 0 (i.e., empty list) at the beginning of each slice for non-wavefront case and at the beginning of each CTU row for wavefront case. For each entry in the palette predictor, a reuse flag is signaled to indicate whether it is part of the current palette in the CU. The reuse flags are sent using run-length coding of zeros. After this, the number of new palette entries and the component values for the new palette entries are signaled. After coding a CU under palette mode, the palette predictor is updated using the current palette, and entries from the palette predictor that are not reused in the current palette are added at the end until the maximum palette size allowed is reached to form the new palette predictor. An escape flag is signaled for each CU to indicate if escape symbols are present in the current CU. If escape symbols are present, the palette table is augmented by one and the last index is assigned to represent the escape symbol.

FIG. 8A and FIG. 8B show horizontal and vertical traverse scans in accordance with some implementations of the present disclosure. Palette indices of samples in a CU form a palette index map. The index map is coded using horizontal and/or vertical traverse scans as shown in FIGS. 8A and 8B. The scan order is explicitly signaled in the bitstream using the palette_transpose_flag.

Figure 9:
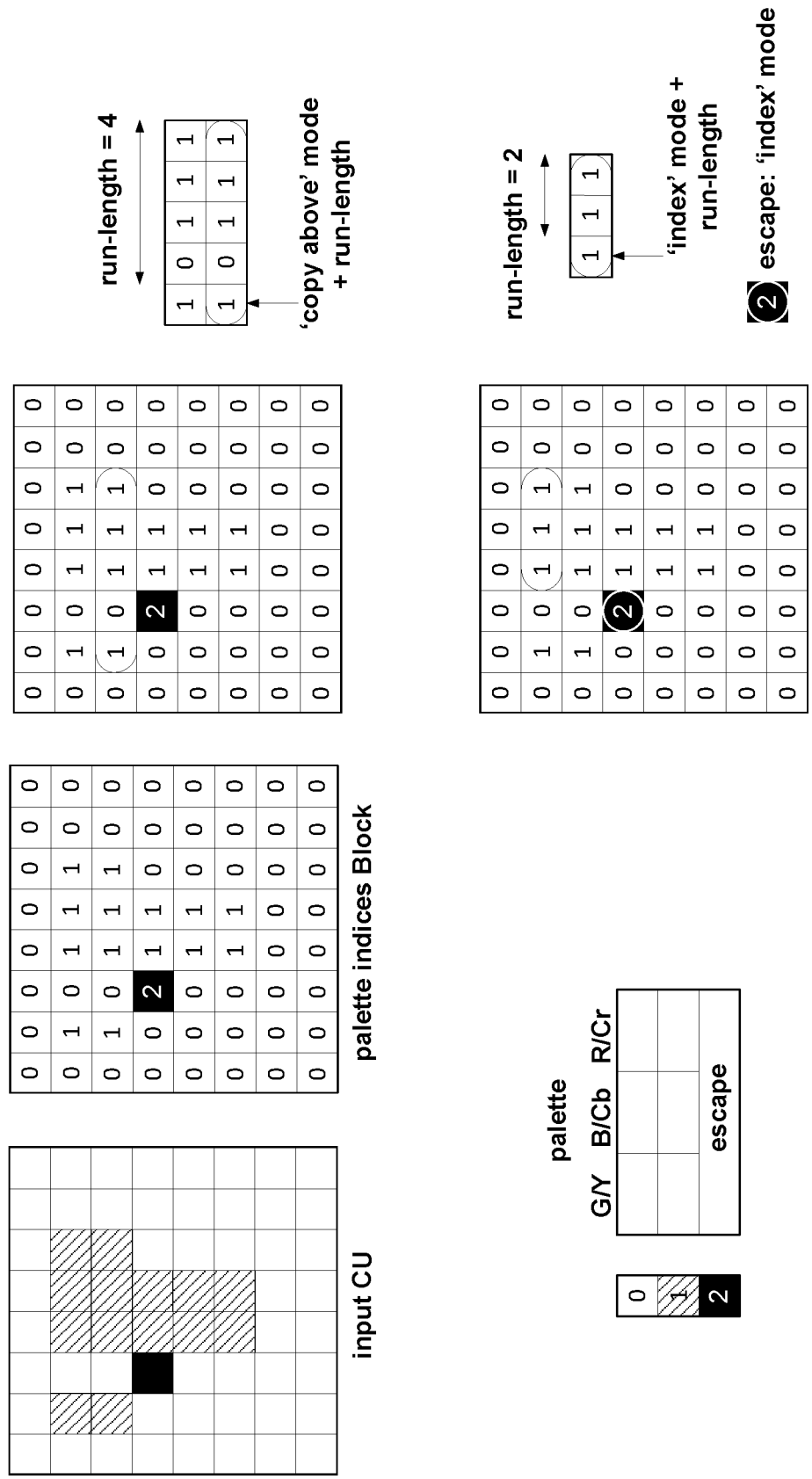
FIG. 9 shows coding of palette indices in accordance with some implementations of the present disclosure.

FIG. 9 shows coding of palette indices in accordance with some implementations of the present disclosure. The palette indices are coded using two main palette sample modes: INDEX and COPY_ABOVE. The mode is signaled using a flag except for the top row where only the horizontal scan is used, the first column where only the vertical scan is used, or for palette sample locations where the previous mode was COPY_ABOVE. In the COPY_ABOVE mode, the palette index of the sample in the row above is copied. In the INDEX mode, the palette index is explicitly signaled. For both INDEX and COPY_ABOVE modes, a run value is signaled which specifies the number of pixels that is coded using the same associated mode.

The coding order for index map is as follows. First, the number of index values associated to INDEX runs is signaled. This is followed by signalling of the actual index values for the entire CU using truncated binary coding. Then the palette mode (INDEX or COPY_ABOVE) and run length for each run are signaled in an interleaved manner. Finally, the quantized escape mode colors for the entire CU are grouped together and coded with exponential Golomb coding.

For slices with dual luma/chroma tree, palette is applied on luma (Y component) and chroma (Cb and Cr components) separately. For slices of single tree, palette will be applied on Y, Cb, Cr components jointly, i.e., each entry in the palette contains Y, Cb, Cr values. For deblocking, the block boundary of a palette coded block is not deblocked.

Three different designs of quantization scheme are available and applied to regular transform, transform skip, and palette mode, respectively. Each different quantization design is associated with different shift and scale operations. For blocks where the regular transform is applied, the shift and scale operations are block shape dependent. For blocks where transform skip is applied, the shift and scale operations are not dependent on block shape. For blocks coded in palette mode, only scale operation is performed, and the operation is not dependent on block shape. Such non-unified design may not be optimal from standardization point of view.

In some examples, methods are provided to simplify and further improve transform and quantization. The quantization and de-quantization operations used under transform skip mode and palette mode may be unified by applying the quantization and de-quantization operations used under transform skip mode to palette mode.

In some examples, the quantization and de-quantization operations used under transform skip mode and palette mode are unified by applying the current quantization and de-quantization operations under palette mode to transform skip mode.

In some examples, the quantization and de-quantization operations of the regular transform mode, transform skip mode and palette mode are all unified by applying the quantization and de-quantization operations for regular transform mode to all modes, including transform skip mode and palette mode as well.

Harmonization of Quantization and De-Quantization Used for Transform Skip Mode and Palette Mode In some examples, a same quantization and de-quantization process is applied to both prediction residuals under transform skip mode and escape values under palette mode. The quantization and de-quantization operations that are used under transform skip mode is applied to the palette mode as well. For example, the equations (6) and (7) corresponding to $Quant_{TS}(pResi)$ and $Quant_{TS}^{-1}(pLevel)$ are used for escape values under palette mode, where pResi would be replaced with the original escape values pEsca, and the output from $\text{Quant}_{TS}^{-1}(\text{pLevel})$ in this case would be the reconstructed escape values pEsca'.

Specifically, the quantization operation is described as:

$$pLevel = pEsca \times 2^{transformShift} \frac{encScale[QP\%6]}{2^{14} \times 2^{(QP/6)} \times 2^{transformShift}} \text{ where } transformShift = 15 - bitDepth - (\log_2(W) + \log_2(H))/2,$$

pLevel is the quantized level, pEsca is the escape color value, QP is the quantization parameter, encScale[ ] is the scale value, % denotes a modulo operation, QP %6 represents an operation of QP modulo 6, W is a width of the CU, H is a height of the CU, and bitDepth is a coding bit-depth.

Further, the dequantization operation is accordingly described as:

$$pEsca' = \frac{pLevel}{2^{transformShift}} \times \frac{decScale[QP\%6] \times 2^{(QP/6)} \times 2^{transformShift}}{2^6}$$

where $transformShift = 15 - bitDepth - (\log_2(W) + \log_2(H))/2$, pLevel is the quantized level, pEsca' is the reconstructed escape color value for the CU, QP is the quantization parameter, decScale[ ] is the scale value, % denotes the modulo operation, QP %6 represents the operation of QP modulo 6, W is the width of the CU, H is the height of the CU, and bitDepth is the coding bit-depth.

In some examples, the quantization and de-quantization operations that are used for escape values under the palette mode are applied to prediction residuals under the transform skip mode as well. For example, the equations (8) and (9) corresponding to $\text{Quant}_E(\text{pEsca})$ and $\text{Quant}_E^{-1}(\text{pLevel})$ are used for prediction residual values under the transform skip mode, where pEsca would be replaced with the prediction residual values pResi, and the output from $\text{Quant}_E^{-1}(\text{pLevel})$ in this case would be the reconstructed prediction residual values pResi'.

Specifically, the quantization operation is described as:

$$pLevel = pResi \times \frac{encScale[QP\%6]}{2^{14} \times 2^{(QP/6)}}$$

where pLevel is the quantized level, pResi is the prediction residual sample value, encScale[ ] is the scale value, QP is the quantization parameter, % denotes the modulo operation, QP %6 represents the operation of QP modulo 6.

Further, the de-quantization operation is described as:

$$pResi' = pLevel \times \frac{decScale[QP\%6] \times 2^{(QP/6)}}{2^6}$$

where pLevel is the quantized level, pResi' is the reconstructed prediction residual sample value, decScale[ ] is the scale value, QP is the quantization parameter, % denotes the modulo operation, QP %6 represents the operation of QP modulo 6.

Harmonization of Quantization and De-Quantization Used for Regular Transform Mode, Transform Skip Mode, and Palette Mode In some examples, the quantization and de-quantization operations of the regular transform mode, transform skip mode and palette mode are all unified by applying the quantization and de-quantization operations for regular transform mode to all modes, including transform skip mode and palette mode as well.

In some examples, the quantization and de-quantization processes for the regular transform mode are used for the transform skip mode and palette mode as well. For example, the equations (2), (3), (4) and (5) are also used for the quantization/de-quantization process under transform skip mode and palette mode.

In some examples, when the Quant(pCoeff) and $\text{Quant}^{-1}(\text{pLevel})$ functions are used for prediction residual values pResi under the transform skip mode, pCoeff would be replaced with $pResi \cdot 2^{transformShift}$, and the output from $\text{Quant}^{-1}(\text{pLevel})$ in this case would be equal to $pResi' \cdot 2^{transformShift}$. As a result, the reconstructed prediction residual value pResi' is derived by $\text{Quant}^{-1}(\text{pLevel})/2^{transformShift}$. Accordingly, except some shift operations, the same quantization and de-quantization functions for transform skip coefficients are used for prediction residual values under transform skip mode.

Specifically, the quantization operation may be described as:

$$pLevel = pResi \times 2^{transformShift} \times \frac{encScale[rectNonTsFlag][QP\%6]}{2^{14} \times 2^{(QP/6)} \times 2^{transformShift'}} transformShift = 15 - bitDepth - (\log_2(W) + \log_2(H))/2 \text{ } transformShift' = rectNonTsFlag?(transformShift - 1):$$

transformShift where pLevel is the quantized level, pResi is the prediction residual sample value, encScale[ ][ ] is the scale value, QP is the quantization parameter, % denotes the modulo operation, QP %6 represents the operation of QP modulo 6, W is the width of the CU, H is the height of the CU, bitDepth is the coding bit-depth, rectNonTsFlag equals 0 when the CU is classified as a normal block, and rectNonTsFlag equals 1 when the CU is classified as a compensated block.

Further, the de-quantization operation may be described as:

$$pResi' \times 2^{transformShift} = pLevel \times \frac{decScale[rectNonTsFlag][QP\%6] \times 2^{(QP/6)} \times 2^{transformShift'}}{2^6}$$

$$transformShift = 15 - bitDepth - (\log_2(W) + \log_2(H))/2,$$

$$transformShift' = rectNonTsFlag?(transformShift - 1):$$

transformShift where pLevel is the quantized level, pResi' is the reconstructed prediction residual sample value, decScale[ ][ ] is the scale value, QP is the quantization parameter, % denotes the modulo operation, QP %6 represents the operation of QP modulo 6, W is the width of the CU, H is the height of the CU, bitDepth is the coding bit-depth, rectNonTsFlag equals 0 when the CU is classified as a normal block, and rectNonTsFlag equals 1 when the CU is classified as a compensated block.

In some examples, when the Quant(pCoeff) and Quant$^{-1}$(pLevel) functions are used for escape values pEsca under the palette mode, pCoeff would be replaced with pReca·$2^{transformShift}$, and the output from Quant$^{-1}$(pLevel) in this case would be equal to pEsca'·$2^{transformShift}$. As a result, the reconstructed escape value pEsca' is derived by Quant$^{-1}$(pLevel)/$2^{transformShift}$. So, except some shift operations, the same quantization and de-quantization functions for transform skip coefficients are also used for escape values under the palette mode.

Specifically, the quantization operation may be described as:

$$pLevel =$$
$$pEsca \times 2^{transformShift} \times \frac{encScale[rectNonTsFlag][QP\%6]}{2^{14} \times 2^{(QP/6)} \times 2^{transformShift'}} \, transformShift =$$
$$15 - bitDepth - (\log_2(W) + \log_2(H))/2 \, transformShift' =$$
$$rectNonTsFlag\,?\,(transformShift - 1):$$

transformShift wherein pLevel is the quantized level, pEsca is the escape color value, encScale[ ] [ ] is the scale value, QP is the quantization parameter, % denotes the modulo operation, QP%6 represents the operation of QP modulo 6, W is the width of the CU, H is the height of the CU, bitDepth is the coding bit-depth, rectNonTsFlag equals 0 when the CU is classified as a normal block, and rectNonTsFlag equals 1 when the CU is classified as a compensated block.

It is worth noting that the quantization and dequantization processes according to Quant(pCoeff) and Quant$^{-1}$(pLevel) may not be used to support lossless coding in VVC because perfect reconstruction is not guaranteed even with a quantization step size of 1 using these two functions.

Figure 10:
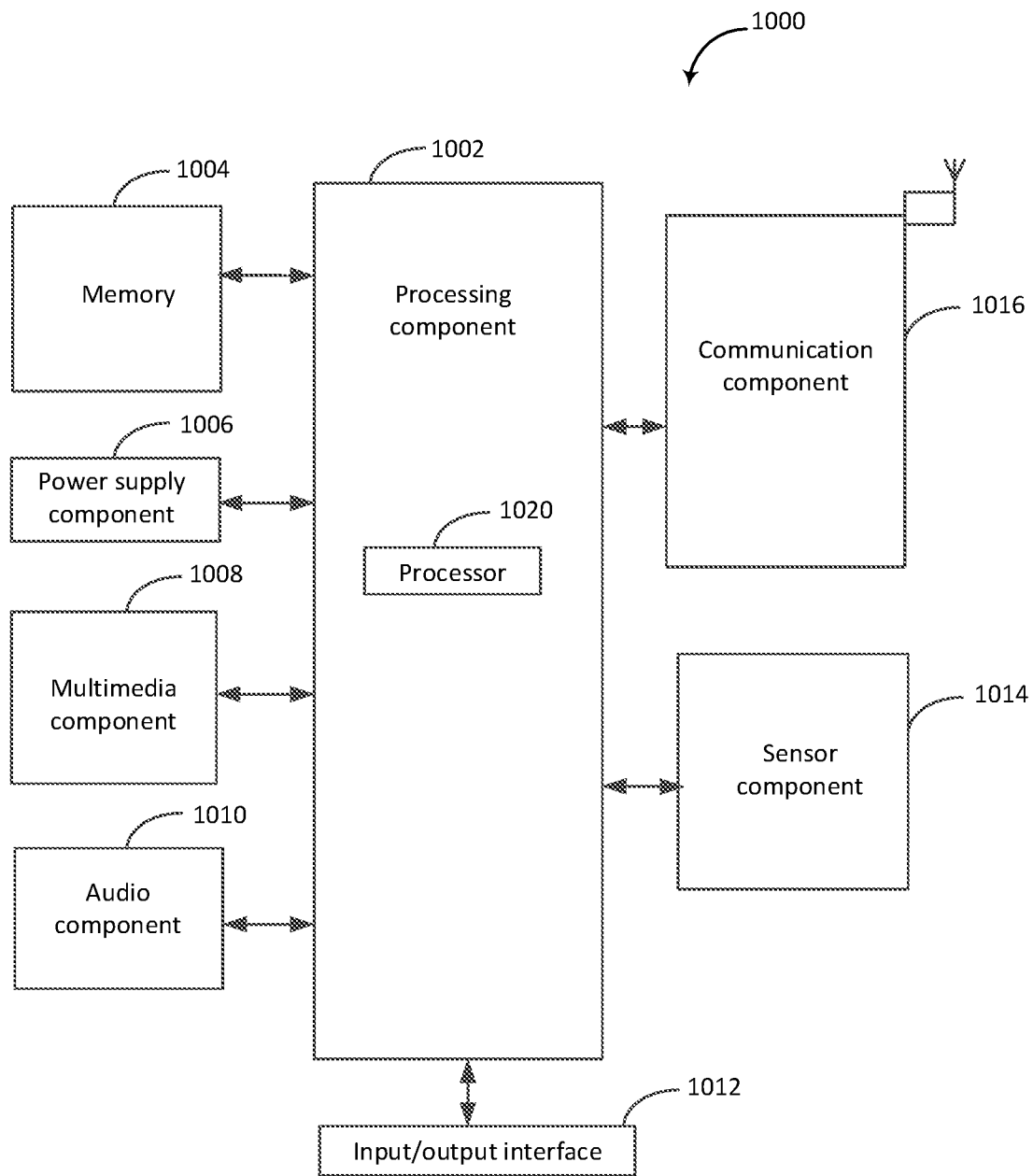
FIG. 10 is a block diagram illustrating an apparatus for video coding in accordance with some implementations of the present disclosure.

In some examples, when the above method is used to unify the quantization and dequantization processes of different sample values, a separate flag, for example, trans_quant_bypass_flag, may be signaled in bitstream to indicate if a given image area, for example, a CU is coded in lossless mode. If such a flag indicates a given block is coded in lossless mode, the corresponding quantization and dequantization processes are bypassed for the coding of the block FIG. 10 is a block diagram illustrating an apparatus for video coding in accordance with some implementations of the present disclosure. The apparatus 1000 may be a terminal, such as a mobile phone, a tablet computer, a digital broadcast terminal, a tablet device, or a personal digital assistant.

As shown in FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 usually controls overall operations of the apparatus 1000, such as operations relating to display, a telephone call, data communication, a camera operation and a recording operation. The processing component 1002 may include one or more processors 1020 for executing instructions to complete all or a part of steps of the above method. Further, the processing component 1002 may include one or more modules to facilitate interaction between the processing component 1002 and other components. For example, the processing component 1002 may include a multimedia module to facilitate the interaction between the multimedia component 1008 and the processing component 1002.

The memory 1004 is configured to store different types of data to support operations of the apparatus 1000. Examples of such data include instructions, contact data, phonebook data, messages, pictures, videos, and so on for any application or method that operates on the apparatus 1000. The memory 1004 may be implemented by any type of volatile or non-volatile storage devices or a combination thereof, and the memory 1004 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1006 supplies power for different components of the apparatus 1000. The power supply component 1006 may include a power supply management system, one or more power supplies, and other components associated with generating, managing and distributing power for the apparatus 1000.

The multimedia component 1008 includes a screen providing an output interface between the apparatus 1000 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1008 may include a front camera and/or a rear camera. When the apparatus 1000 is in an operation mode, such as a shooting mode or a video mode, the front camera and/or the rear camera may receive external multimedia data.

The audio component 1010 is configured to output and/or input an audio signal. For example, the audio component 1010 includes a microphone (MIC). When the apparatus 1000 is in an operating mode, such as a call mode, a recording mode and a voice recognition mode, the microphone is configured to receive an external audio signal. The received audio signal may be further stored in the memory 1004 or sent via the communication component 1016. In some examples, the audio component 1010 further includes a speaker for outputting an audio signal.

The I/O interface 1012 provides an interface between the processing component 1002 and a peripheral interface module. The above peripheral interface module may be a keyboard, a click wheel, a button, or the like. These buttons may include but not limited to, a home button, a volume button, a start button and a lock button.

The sensor component 1014 includes one or more sensors for providing a state assessment in different aspects for the apparatus 1000. For example, the sensor component 1014 may detect an on/off state of the apparatus 1000 and relative locations of components. For example, the components are a display and a keypad of the apparatus 1000. The sensor component 1014 may also detect a position change of the apparatus 1000 or a component of the apparatus 1000, presence or absence of a contact of a user on the apparatus 1000, an orientation or acceleration/deceleration of the apparatus 1000, and a temperature change of apparatus 1000. The sensor component 1014 may include a proximity sensor configured to detect presence of a nearby object without any physical touch. The sensor component 1014 may further include an optical sensor, such as a CMOS or CCD image sensor used in an imaging application. In some examples, the sensor component 1014 may further include an acceleration sensor, a gyroscope sensor, a magnetic sensor, a pressure sensor, or a temperature sensor.

The communication component 1016 is configured to facilitate wired or wireless communication between the apparatus 1000 and other devices. The apparatus 1000 may access a wireless network based on a communication standard, such as WiFi, 4G, or a combination thereof. In an example, the communication component 1016 receives a broadcast signal or broadcast related information from an external broadcast management system via a broadcast channel. In an example, the communication component 1016 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1000 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 11:
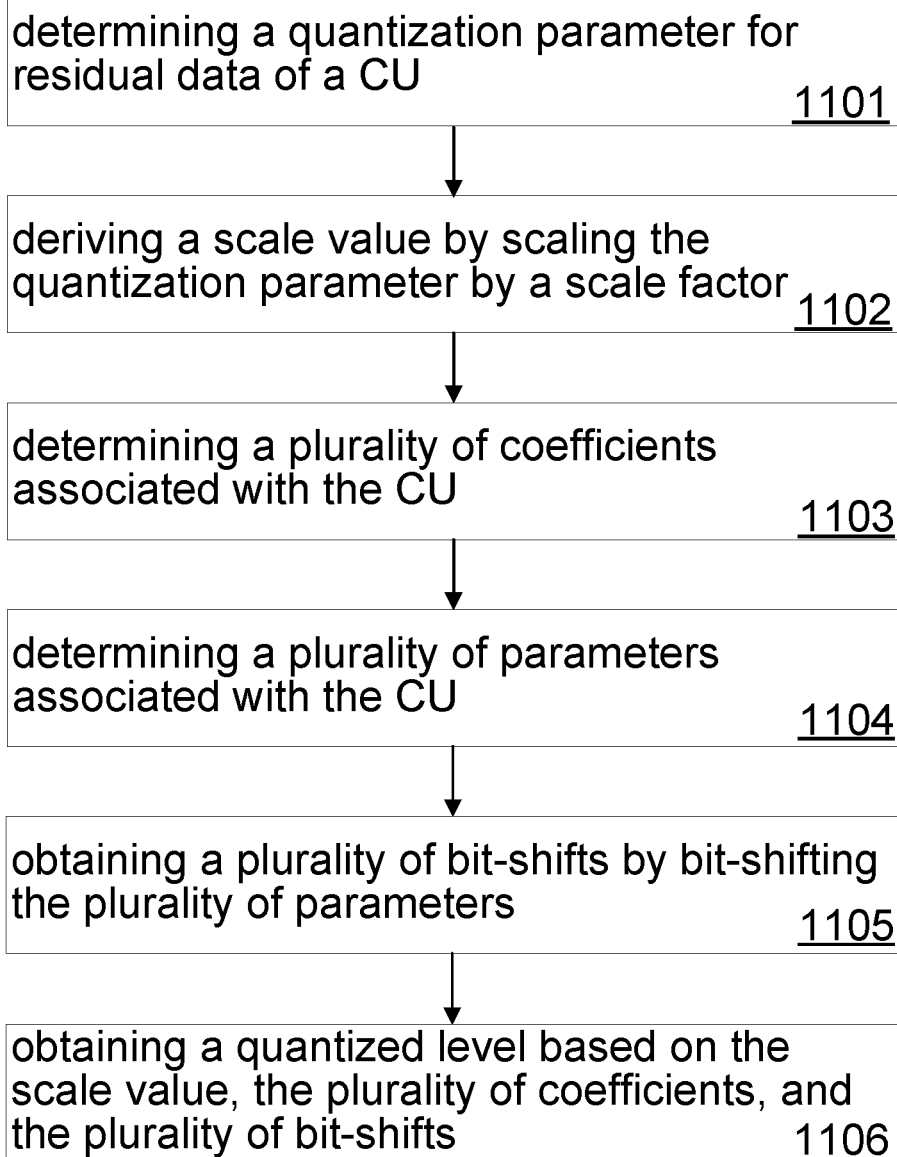
FIG. 11 is a flowchart illustrating an exemplary process of quantization design in video coding in accordance with some implementations of the present disclosure.

FIG. 11 is a flowchart illustrating an exemplary process of quantization design in video coding in accordance with some implementations of the present disclosure. The process may be applied in an encoder.

In step 1101, the processor 1020 determines a quantization parameter for residual data of a CU.

In step 1102, the processor 1020 derives a scale value by scaling the quantization parameter by a scale factor.

In step 1103, the processor 1020 determines a plurality of coefficients associated with the CU.

In some examples, the plurality of coefficients may comprise a transform coefficient, an escape color value for the CU, and a prediction residual sample value.

In step 1104, the processor 1020 determines a plurality of parameters associated with the CU.

In some examples, the plurality of parameters comprises a bit-shift that is determined based on a coding bit-depth, and a width and a height of the CU, and the scale factor is determined based on the width and the height of the CU.

In step 1105, the processor 1020 obtains a plurality of bit-shifts by bit-shifting the plurality of parameters.

In step 1106, the processor 1020 obtains a quantized level based on the scale value, the plurality of coefficients, and the plurality of bit-shifts.

In some examples, when the processor 1020 determines the plurality of coefficients associated with the CU, the processor 1020 further determines an escape color value for the CU. The escape color value may be a value for a pixel in the CU with a color not in a preset plurality of colors selected from the CU. And when the processor 1020 obtains the quantized level based on the scale value, the plurality of coefficients, and the plurality of bit-shifts, the processor 1020 further obtains the quantized level based on the scale value, the escape color value, and the plurality of bit-shifts.

In some examples, the processor 1020 further determines a prediction residual sample associated with the CU. If the processor 1020 determines the plurality of coefficients associated with the CU, the processor 1020 further determines a prediction residual sample value corresponding to the prediction residual sample. When the processor 1020 obtains the quantized level based on the scale value, the plurality of coefficients, and the plurality of bit-shifts, the processor 1020 further obtains the quantized level based on the scale value, the prediction residual sample value, and the plurality of bit-shifts.

Figure 12:
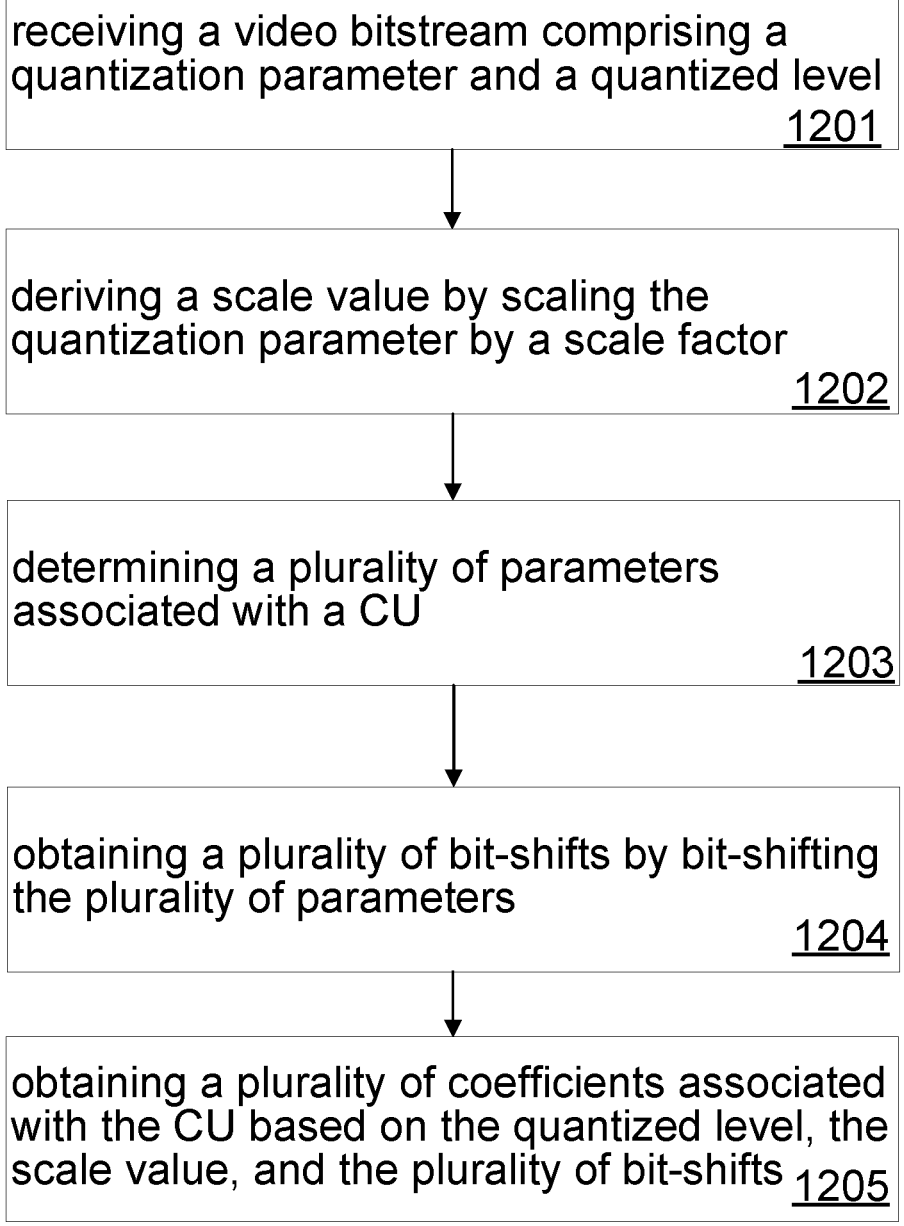
FIG. 12 is a flowchart illustrating an exemplary process of de-quantization design in video coding in accordance with some implementations of the present disclosure.

FIG. 12 is a flowchart illustrating an exemplary process of de-quantization design in video coding in accordance with some implementations of the present disclosure. The process may be applied in a decoder.

In step 1201, the processor 1020 receives a video bitstream comprising a quantization parameter and a quantized level.

In step 1202, the processor 1020 derives a scale value by scaling the quantization parameter by a scale factor.

In step 1203, the processor 1020 determines a plurality of parameters associated with a CU.

In some examples, the plurality of parameters may comprise a bit-shift that is determined based on a coding bit-depth, and a width and a height of the CU, and the scale factor is determined based on the width and the height of the CU.

In step 1204, the processor 1020 obtains a plurality of bit-shifts by bit-shifting the plurality of parameters.

In step 1205, the processor 1020 obtains a plurality of coefficients associated with the CU based on the quantized level, the scale value, and the plurality of bit-shifts.

In some examples, the plurality of coefficients may comprise a reconstructed transform coefficient, a reconstructed escape color value for the CU, and a reconstructed prediction residual sample value.

In some examples, when the processor 1020 obtains the plurality of coefficients associated with the CU based on the quantized level, the scale value, and the plurality of bit-shifts, the processor 1020 further obtains a reconstructed escape color value for the CU based on the quantized level, the scale value, and the plurality of bit-shifts. And the reconstructed escape color value is a value for a pixel in the CU with a color not in a preset plurality of colors selected from the CU.

In some examples, the processor 1020 further determines a prediction residual sample associated with the CU. When the processor 1020 obtains the plurality of coefficients associated with the CU based on the quantized level, the scale value, and the plurality of bit-shifts, the processor 1020 obtains the reconstructed prediction residual sample value for the CU based on the quantized level, the scale value, and the plurality of bit-shifts. And the reconstructed prediction residual sample value may be corresponding to the prediction residual sample.

In some examples, there is provided a computing device for video coding. The apparatus includes a processor 1020; and a memory 1004 configured to store instructions executable by the processor; where the processor, upon execution of the instructions, is configured to perform a method as illustrated in FIG. 11.

In some examples, there is provided a computing device for video coding. The apparatus includes a processor 1020; and a memory 1004 configured to store instructions executable by the processor; where the processor, upon execution of the instructions, is configured to perform a method as illustrated in FIG. 12.

In some other examples, there is provided a non-transitory computer readable storage medium 1004, having instructions stored therein. When the instructions are executed by a processor 1020, the instructions cause the processor to perform a method as illustrated in FIG. 11.

In some other examples, there is provided a non-transitory computer readable storage medium 1004, having instructions stored therein. When the instructions are executed by a processor 1020, the instructions cause the processor to perform a method as illustrated in FIG. 12.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video encoding, comprising:
   partitioning a video frame into a plurality of video blocks;
   determining, for a first coding block in the plurality of video blocks, a quantization parameter and a quantized level;
   deriving a scale value by looking up a scale level table based on the quantization parameter; and
   in response to determining that the first coding block is coded in a transform skip mode, obtaining a residual sample for a sample in the first coding block based on the quantized level, the scale value and a plurality of bit-shifts by applying a first de-quantization operation,
   wherein the first de-quantization operation is also applied to obtain a reconstructed sample for an escape sample in a second coding block coded in a palette mode in the plurality of video blocks; and
   wherein a block size of the first coding block or the second coding block is not used for determining parameters of the first de-quantization operation.

2. The method of claim 1, further comprising:
   in response to determining that a third coding block in the plurality of video blocks is coded in a regular transform mode, obtaining a residual sample for a sample in the third coding block by applying a second de-quantization operation different from the first de-quantization operation;
   wherein the block size of the third coding block is used for determining parameters of the second de-quantization operation.

3. The method of claim 1, wherein the scale level table is levelScale [k]={40, 45, 51, 57, 64, 72}, wherein k is an integer between 0 and 5 inclusive.

4. The method of claim 1, further comprising:
   generating an escape flag to indicate if the escape sample is present in the second coding block.

5. The method of claim 1, wherein the plurality of bit-shifts comprise a left shift of QP/6 bits and a right shift of 6 bits, wherein QP is the quantization parameter.

6. The method of claim 1, wherein the first de-quantization operation is applied using following equation:

$$pSample = pLevel \times \frac{decScale[QP\%6] \times 2^{(QP/6)}}{2^6}$$

wherein pLevel is a quantized level, pSample corresponds to a reconstructed value of a residual sample in the transform skip mode or an escape sample in the palette mode, decScale [ ] is a scale value, OP is a quantization parameter, % denotes a modulo operation, QP % 6 represents an operation of OP modulo 6.

7. A computing device, comprising:
   one or more processors;
   a non-transitory storage coupled to the one or more processors; and
   a plurality of programs stored in the non-transitory storage that, when executed by the one or more processors, cause the one or more processors to perform acts comprising:
   partitioning a video frame into a plurality of video blocks;
   determining, for a first coding block in the plurality of video blocks, a quantization parameter and a quantized level;
   deriving a scale value by looking up a scale level table based on the quantization parameter; and
   in response to determining that the first coding block is coded in a transform skip mode, obtaining a residual sample for a sample in the first coding block based on the quantized level, the scale value and a plurality of bit-shifts by applying a first de-quantization operation,
   wherein the first de-quantization operation is also applied to obtain a reconstructed sample for an escape sample in a second coding block coded in a palette mode in the plurality of video blocks; and
   wherein a block size of the first coding block or the second coding block is not used for determining parameters of the first de-quantization operation.

8. The computing device of claim 7, wherein the plurality of programs, when executed by the one or more processors, cause the one or more processors to further perform acts comprising:
   in response to determining that a third coding block in the plurality of video blocks is coded in a regular transform mode, obtaining a residual sample for a sample in the third coding block by applying a second de-quantization operation different from the first de-quantization operation;
   wherein the block size of the third coding block is used for determining parameters of the second de-quantization operation.

9. The computing device of claim 7, wherein the scale level table is levelScale [k] ={40, 45, 51, 57, 64, 72}, wherein k is an integer between 0 and 5 inclusive.

10. The computing device of claim 7, wherein the plurality of programs, when executed by the one or more processors, cause the one or more processors to further perform acts comprising:

generating an escape flag to indicate if the escape sample is present in the second coding block.

11. The computing device of claim 7, wherein the plurality of bit-shifts comprise a left shift of QP/6 bits and a right shift of 6 bits, wherein QP is the quantization parameter.

12. The computing device of claim 7, wherein the first de-quantization operation is applied using following equation:

$$pSample = pLevel \times \frac{decScale[QP\%6] \times 2^{(QP/6)}}{2^6}$$

wherein pLevel is a quantized level, pSample corresponds to a reconstructed value of a residual sample in the transform skip mode or an escape sample in the palette mode, decScale [ ] is a scale value, OP is a quantization parameter, % denotes a modulo operation, QP % 6 represents an operation of OP modulo 6.

13. A non-transitory computer readable storage medium storing a bitstream generated by a method for video encoding, executed by a processor, comprising:
   partitioning a video frame into a plurality of video blocks;
   determining, for a first coding block in the plurality of video blocks, a quantization parameter and a quantized level;
   deriving a scale value by looking up a scale level table based on the quantization parameter; and
   in response to determining that the first coding block is coded in a transform skip mode, obtaining a residual sample for a sample in the first coding block based on the quantized level, the scale value and a plurality of bit-shifts by applying a first de-quantization operation,
   wherein the first de-quantization operation is also applied to obtain a reconstructed sample for an escape sample in a second coding block coded in a palette mode in the plurality of video blocks; and
   wherein a block size of the first coding block or the second coding block is not used for determining parameters of the first de-quantization operation.

14. The non-transitory computer readable storage medium of claim 13, wherein the method further comprises:
   in response to determining that a third coding block in the plurality of video blocks is coded in a regular transform mode, obtaining a residual sample for a sample in the third coding block by applying a second de-quantization operation different from the first de-quantization operation;
   wherein the block size of the third coding block is used for determining parameters of the second de-quantization operation.

15. The non-transitory computer readable storage medium of claim 13, wherein the scale level table is levelScale [k]={40, 45, 51, 57, 64, 72}, wherein k is an integer between 0 and 5 inclusive.

16. The non-transitory computer readable storage medium of claim 13, wherein the method further comprises:
   generating an escape flag to indicate if the escape sample is present in the second coding block.

17. The non-transitory computer readable storage medium of claim 13, wherein the plurality of bit-shifts comprise a left shift of QP/6 bits and a right shift of 6 bits, wherein QP is the quantization parameter.

18. The non-transitory computer readable storage medium of claim 13, wherein the first de-quantization operation is applied using following equation:

$$pSample = pLevel \times \frac{decScale[QP\%6] \times 2^{(QP/6)}}{2^6}$$

wherein pLevel is a quantized level, pSample corresponds to a reconstructed value of a residual sample in the transform skip mode or an escape sample in the palette mode, decScale [ ] is a scale value, OP is a quantization parameter, % denotes a modulo operation, QP % 6 represents an operation of OP modulo 6.

* * * * *